United States Patent [19]
Friedrich et al.

[11] Patent Number: 5,368,203
[45] Date of Patent: Nov. 29, 1994

[54] SPICE RACK WITH MAGNETICALLY HELD SPICE CONTAINERS

[75] Inventors: Rainer Friedrich, Nassau/Lahn; Rolf G. Schülein, Singhofen, both of Germany

[73] Assignee: Leifheit AG, Nassau/Lahn, Germany

[21] Appl. No.: 951,168

[22] Filed: Sep. 25, 1992

[30] Foreign Application Priority Data

Sep. 26, 1991 [DE] Germany .................. 4132016
Mar. 27, 1992 [DE] Germany .................. 4209949

[51] Int. Cl.⁵ ............................... B67D 5/06
[52] U.S. Cl. ........................ 222/179.5; 222/180; 222/142.3; 248/206.5; 248/312.1; 206/818; 211/DIG. 1
[58] Field of Search .............. 222/180, 142.3, 179.5, 222/173, 196.1, 548, 480, 565; 248/206.5, 311.2, 311.3, 312, 312.1; 211/DIG. 1; 206/818

[56] References Cited

U.S. PATENT DOCUMENTS 2,292,651  8/1942  Olevin ................. 222/179.5 X
4,569,462  2/1986  Belokin .

FOREIGN PATENT DOCUMENTS 0183943   6/1986   European Pat. Off. .
2623166   5/1989   France .
7227485  12/1972   Germany .
8104395   7/1981   Germany .
8906736.3 10/1989  Germany .
932918    7/1963   United Kingdom .

Primary Examiner—Gregory L. Huson
Attorney, Agent, or Firm—Frishauf, Holtz, Goodman & Woodward

[57] ABSTRACT

A spice container assembly includes a removable closure body for a spice container that is detachably secured to a stationary tubular holder. The spice container in turn, is held by the closure body via a magnet, to facilitate one-handed removal of a unit comprising the spice container and the closure body from the holder. The spice container is retained in or on the closure body by a magnetic force which is used to seal the spice container.

20 Claims, 5 Drawing Sheets

SPICE RACK WITH MAGNETICALLY HELD SPICE CONTAINERS

BACKGROUND OF THE INVENTION

1. Field of the Invention

The invention relates to a spice container and holding assembly that includes a holder for at least one spice container, and wherein each spice container includes a removable closure body. The assembly uses magnetic forces to seal the at least one spice container and to hold the at least one spice container in the holder. The closure body is secured detachably to the holder. Each spice container is removable with one hand by a user from the holder, the holder being attachable to a fixed support.

2. Description of the Prior Art

Most modern kitchens have spice racks, shelves or table top arrangements that are equipped with simple spice shakers or spice containers that generally have a closure cap for sealing a spice therein.

In prior art spice containers, the closure body is screwed onto the neck of the spice container or slipped onto it. In spice containers with screwed-on closure bodies, manipulation of the container is made difficult by the necessity of screwing the closure body onto the container and then unscrewing it from the container when it is to be used. Known slipped-on or pushed-on closure bodies have the disadvantage that they do not close tightly, which leads to a loss of aroma of the spices.

German Patent Disclosure DE-U1 89 06 736 discloses a spice container for use in a spice rack that can be removed from the spice rack with one hand; the container has an outlet opening that also can be opened with one hand. German Patent Disclosure DE-U1 89 06 736, however, achieves this result with a rather complicated relatively fragile and expensive lever flap system. Another disadvantage of the device disclosed in German Patent Disclosure DE-U1 89 06 736 is that the arrangement therein has a very uneven surface and therefore, on the one hand, easily collects dust and dirt, and on the other hand, is difficult to clean. This is a particularly important disadvantage in a kitchen environment where cleanliness can be a measure of a housekeeper's efficiency and diligence.

In another prior art spice container, known from German Patent Disclosure DE-GM 81 04 395, a rack is provided with built-in lid recesses for holding the spice containers. This arrangement has the disadvantages that the spice containers are practically impossible to detach from the rack for use and that the spice containers cannot be tightly closed. The fact that the lid recesses for holding the spice containers in this prior art apparatus are located in the rack, also fixes the maximum number of spice containers that the rack can hold from the very outset.

Moreover, German Patent Disclosure DE-GM 81 04 395 provides a holder (rack) that can only be attached to the container in a stationary fashion. In said German Patent Disclosure DE-GM 81 04 395 the holder is provided with female threads on its underside, into which respectively the spice containers, which have a corresponding male thread, are screwed.

As noted above, disadvantages of German Patent Disclosure DE-GM 81 04 395 are that the spice containers are very difficult to detach from the rack for use at a table, and that the spice containers cannot be closed tightly to prevent loss of aroma. If the spice containers are screwed on tightly to try to prevent loss of aroma, then they will require a good deal of effort to unscrew.

SUMMARY OF THE INVENTION

An object of the present invention is to provide an overall assembly that includes a spice container holder and spice containers which respectively have a closure body that is detachably secured to the holder for holding the spice containers in the holder and wherein each spice container can be respectively removed from the holder with one hand.

Another object of the present invention is to provide a spice container with a closure body which can be used for each spice container at a table and wherein the assembly can be easily assembled and manufactured such that the closure body for each spice container assures an aroma-tight seal when the spice container is mounted on the holder.

Another object of the present invention is to provide a spice container wherein light soiling of the spice container can be concealed by the shape thereof and wherein the spice container and the closure body can be coated with a plastic to facilitate cleaning. A plastic coating over the magnet or over a scattering plate makes cleaning even easier.

The above objects are attained according to the present invention by providing a spice container which is retained in or on a closure body by using magnetic forces wherein a spice shaker disk is formed as an opposite pole of a magnet located in the closure body.

DETAILED DESCRIPTION

Figure 1:
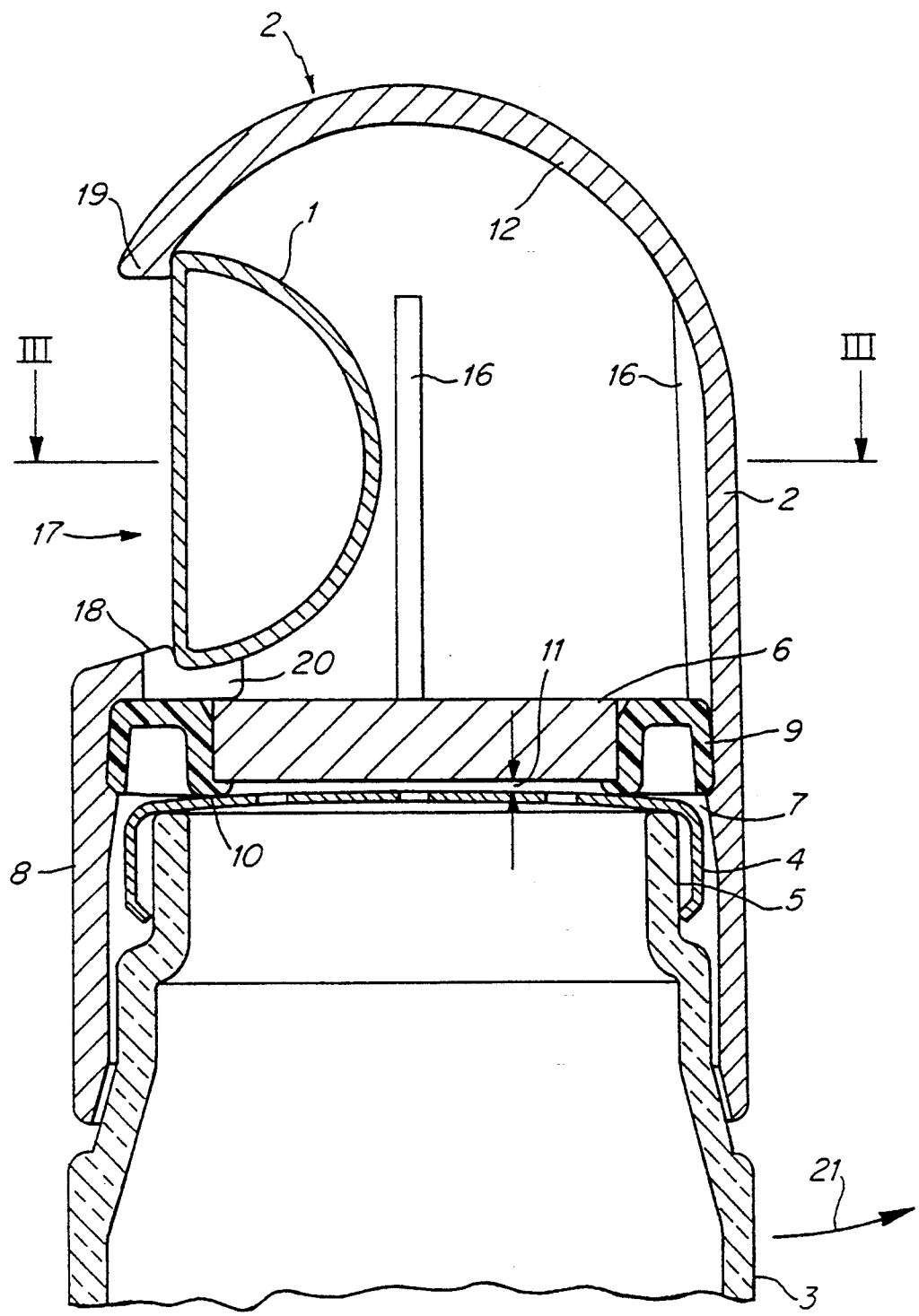
FIG. 1 is a sectional view taken through a complete arrangement of a mount, a closure body and an upper portion of a spice container.
Figure 2:
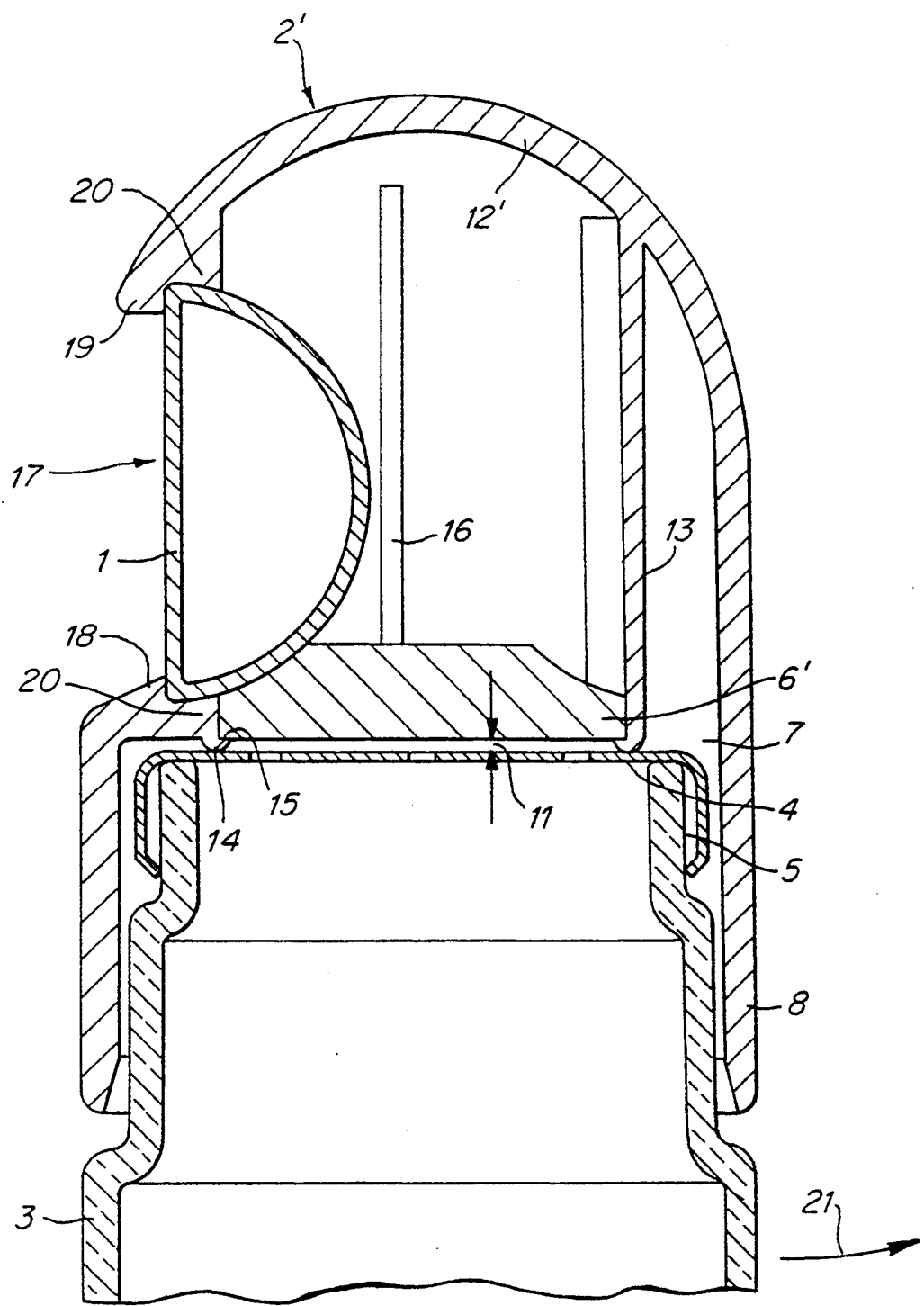
FIG. 2, in a view equivalent to FIG. 1, shows an alternative version of the present invention.

Referring to FIGS. 1 and 2, a holder 1 in the form of an elongated tube of substantially semicircular cross section is shown, to which a closure body 2 is detachably secured. The closure body 2 receives a removable spice container 3, which can be made of glass, plastic or the like and whose neck 5 is covered by a shaker cap 4. The shaker cap 4 is screwed or clamped onto the neck 5 and comprises a magnetic (ferromagnetic) material.

The closure body 2 has a tubular receiving part 8 (see FIG. 2) for holding and receiving the container neck 5. The receiving part 8 is provided on its inner end 7, with a magnet 6, which cooperates with the magnetic shaker cap 4. The magnet 6 is embedded in a soft plastic sealing ring 9, (see FIG. 1) which is press-fitted into the receiving part 8 of closure body 2 or locked in place in detent fashion. The sealing ring 9 fits around the rim of the magnet 6 and forms an annular sealing lip 10, which is pressed onto the shaker cap 4 by the force of the magnet 6. At the same time, sealing lip 10 defines a narrow air space 11 between the magnet 6 and its opposite pole, the shaker cap 4. The magnet 6 is supported by support ribs 16 (see FIG. 3).

To prevent the magnetic element from "sticking" to the magnet, means are provided for maintaining a narrow air gap between these parts.

The magnet may be retained, as noted above, in a soft plastic sealing ring 9 that is press-fitted into the tubular receiving part 8 of the closure body. A rim of the sealing ring 9, fitting around the rim of the magnet 6, on a side thereof facing toward the magnetic element, can assure the formation of the air gap 11 by resting on the magnetic element and thus can improve the sealing between the closure body and the spice container.

On a side opposite the receiving part 8, the closure body 2 has a hoodlike part 12 which has a mounting region 17 for detachably mounting the closure body 2 and spice container 3 on the holder 1. The mounting region 17 is held to holder 1 by a cleat-like element 18, which engages the holder 1 from behind and by mounting cam 19 which forms an end of the hoodlike part 12. The cleat-like element 18 and the mounting cam 19 are enlarged (see FIG. 2) toward the interior of the closure body 2 by bearing regions 20 that cooperate form-fittingly with the holder 1. These bearing regions 20 assure play-free securing of the unit, comprising the closure body 2 and the spice container 3, to the holder 1. For removal from the holder 1, the unit is swiveled in the direction of the arrow 21, in the course of which the closure body 2 comes free from the mount 1 and breaks a magnetic field between the holder and the magnet 6 in the closure body 2 or between the holder and the shaker cap 4.

In the modification shown in FIG. 2, the magnet 6' is held by a ring 13 formed as part of the hood part 12' of the closure body 2'; the ring 13 ends in an undercut annular sealing bead 14. The undercut portion 15 of the sealing bead 14 and the sealing bead 14 define the air gap or space 11 between the magnet 6' and the shaker cap 4. In this version, shown in FIG. 2, the mounting cam and cleat 18, with their respective bearing regions 20, are used to engage the holder 1 from behind. When the unit, comprising the closure body 2' and spice container 3, is swiveled in the direction of the arrow 21, the mounting cam 19, because of its somewhat resilient material and its wall thickness, yields somewhat, and as a result the closure body 2' along with the spice container 3 can be removed from the holder 1.

Figure 3:
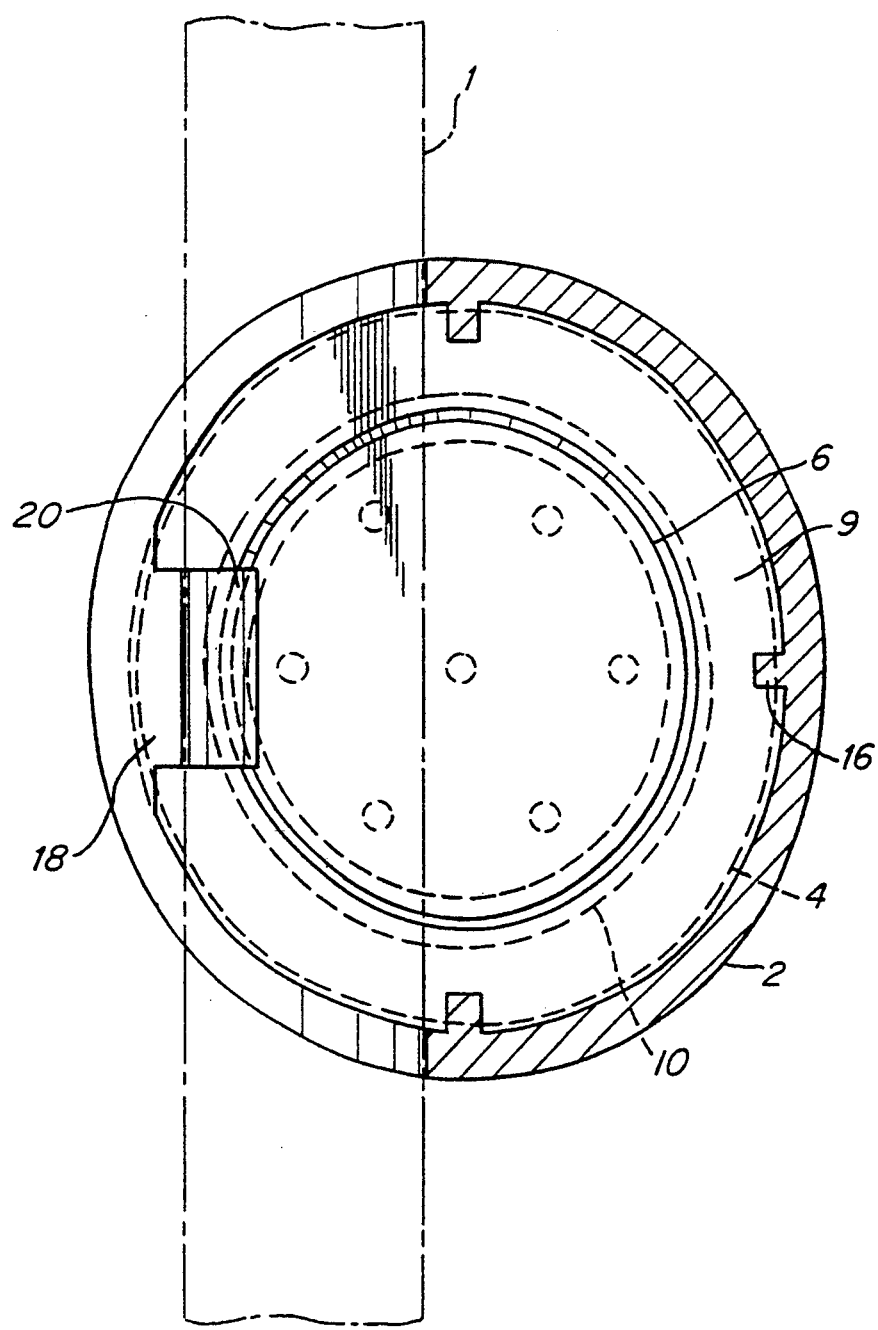
FIG. 3 is a sectional view taken along the line III—III of FIG. 1.

FIG. 3 shows a top sectional view of a spice container taken along line III—III of FIG. 1.

Figure 4:
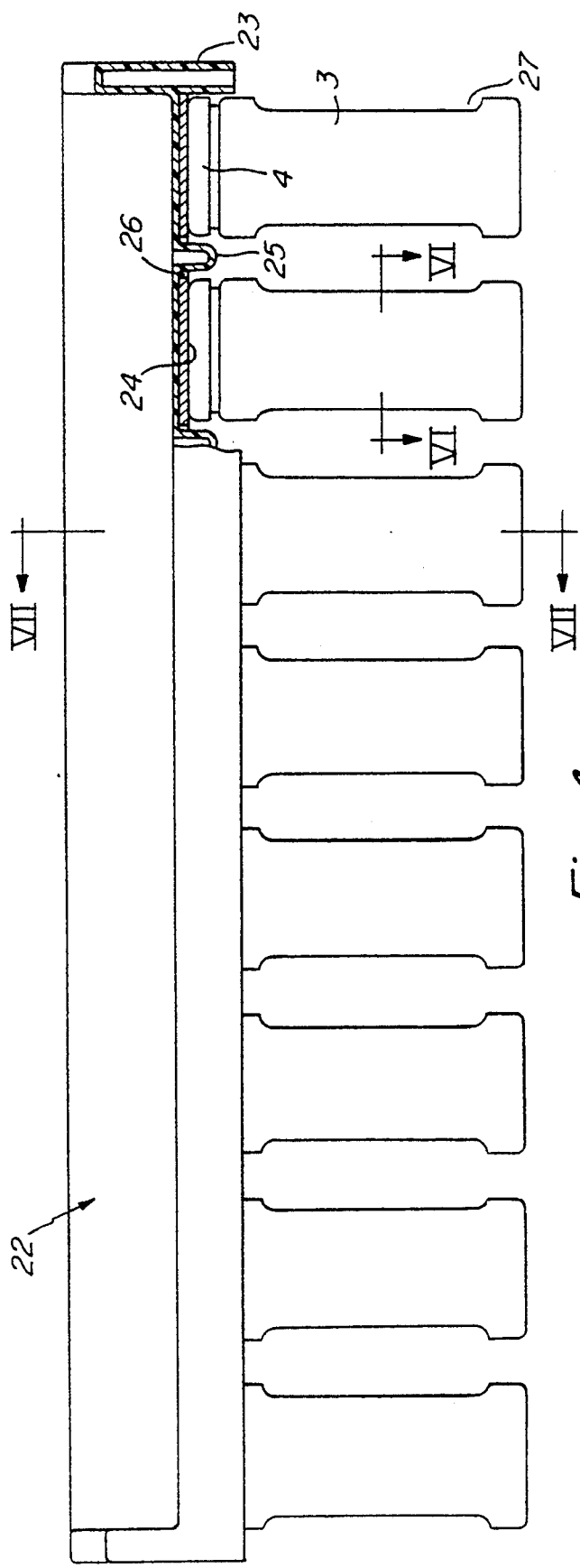
FIG. 4 is a partially cutaway view of a holder with a plurality of spice containers.
Figure 5:
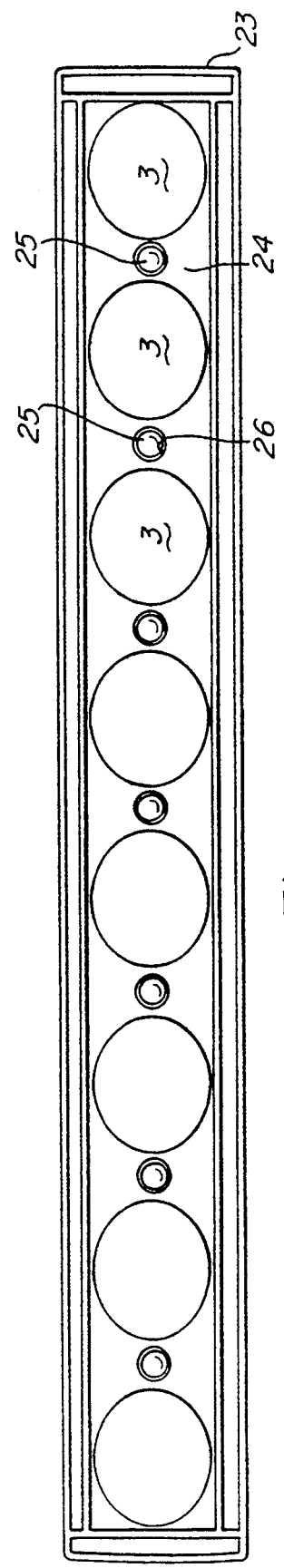
FIG. 5 is a view of FIG. 4 from below.

FIGS. 4 and 5 show another embodiment of the invention comprising a holder 22 (or rack) for a plurality of spice containers 3. The holder 22 has a preferably plastic rail 23, which can be secured to a wall, or the like, for instance by use of adhesive strips. The closure bodies of the spice containers 3, in this case, are integrated with the holder 22 which can be formed by a magnetic strip 24, which is mounted on an underside of the rail 23. As in the previous embodiments, the spice containers 3 are closed by a shaker cap 4 comprising a magnetic material, and the spice container are retained on the holder 22 by the magnetic attraction of the magnetic strip 24 acting upon the shaker cap 4. To make individual spice containers 3 easier to grasp, spacers 25 are provided between adjacent spice containers. These spacers 25 may comprise protrusions extending from the rail 23, which extend through openings 26 in the magnetic strip 24. If suitably formed, these protrusions can simultaneously serve to retain the magnetic strip 24 in place against rail 23.

Figure 6:
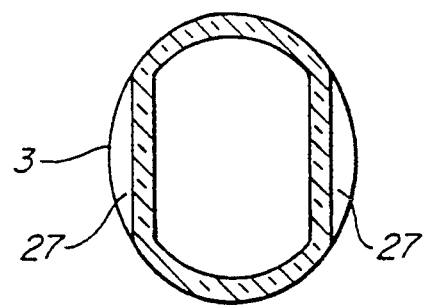
FIG. 6 is a cross-sectional view through a spice container taken along the line VI—VI of FIG. 4.

To further facilitate the grasping of the cylindrical spice containers 3 by a user, the containers are provided with recessed grip portions 27 (FIGS. 4 and 6) on two diametrically opposed sides thereof as shown in FIG. 6. The recessed grip portions 27 could be formed over the completed circumference of containers 3. This allows locating the spice containers 3 very close together on the holder 22 without making access difficult.

In all the embodiments, the magnet 6, 6' and the magnetic strip 24 are shown to be mounted in the closure body 2 and in the holder 22, respectively. The magnetic shaker caps 4, cooperating with the magnet strip or magnetic strip, are mounted on the spice containers 3. Naturally, the arrangement may, in principle, be the reverse of the arrangement described above. Also, instead of a magnetic shaker cap, a suitable metal ring may be wrapped around the neck of the spice container to act as an opposite pole to the magnet 6, 6'.

Figure 7:
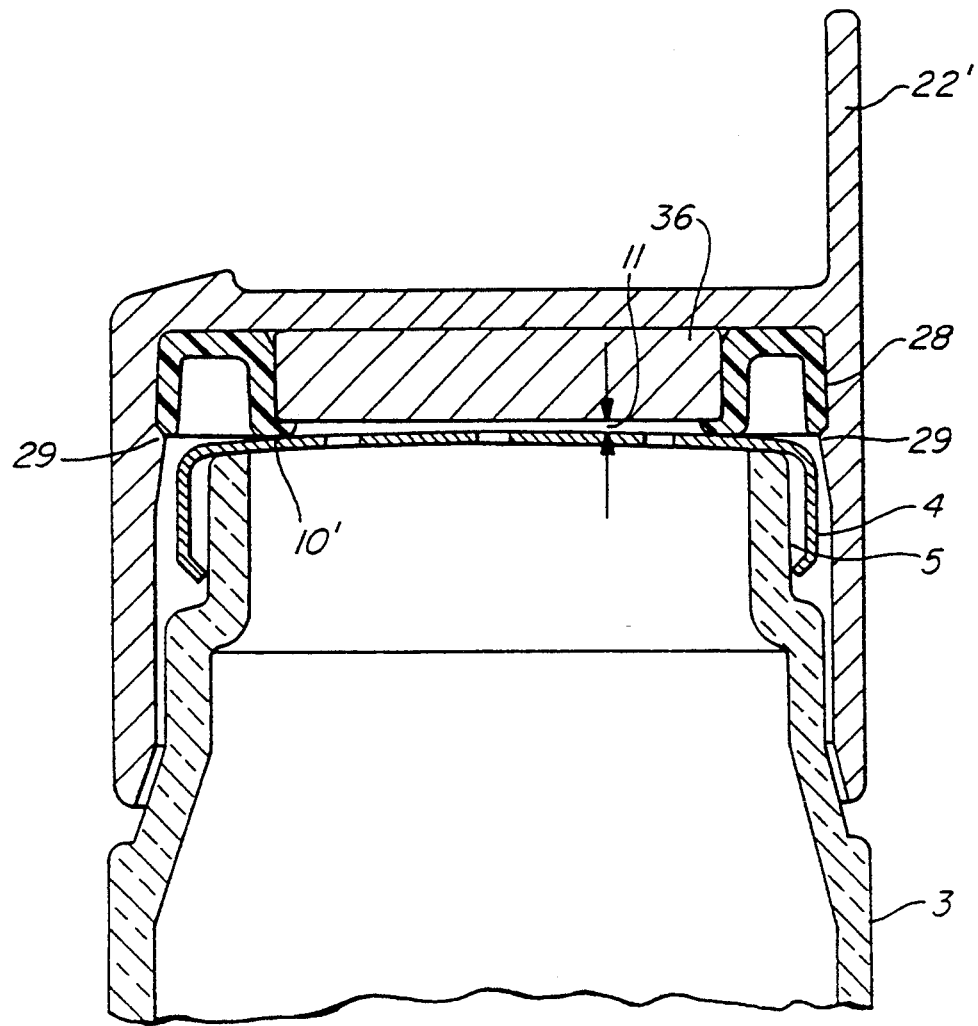
FIG. 7 is a sectional view taken along the line VII—VII of FIG. 4, and is an alternative version with round magnets.

In the embodiment of FIG. 7, instead of the magnetic strip 24 of FIGS. 4 and 5, a sealing strip 28 is secured in the holder 22' to seal the spice container. The sealing strip 28 is inserted into the holder 22' from below and is retained by two detent shoulders 29. The magnets 36, preferably round magnets, are inserted into the sealing strip 28. The magnets 36 are retained by a sealing lip 10', adapted to the shape of the magnet 36, which is pressed by the magnetic force of the magnet 36 onto the magnetic shaker cap 4. Analogously to the embodiment of FIG. 1, the sealing lip 10' defines a narrow air gap or space 11 between the magnet 36 and its opposite pole, the shaker cap 4.

In summary, the use of magnetic retention of the spice container 3 in or on a closure body 2, which in turn, is detachably secured to a holder (rack), assures problem-free, one-handed removal of the spice container from the holder. Moreover, because it is possible for the magnet 6 to be located at a low level in the closure body, it is also possible to visually observe the immediate vicinity where the spice is shaken out, so that any slight dusting with the spice does not significantly affect the overall aesthetic appearance of the arrangement.

The holder 1 is formed as a rod or tube having a semicircular cross-section and the closure body 2 is held resiliently to the holder 1 by a mounting region of the closure body. The holder may be mounted to a stationary support, such as a wall. This means that, on the one hand, the closure body 2 is securely held to the spice container 3 by the magnetic force of the magnet 6 as the spice container is being removed by a user with one hand, and on the other hand, the entire unit comprising the closure body 2 and the spice container 3 can easily be removed from the holder 1 by a swiveling motion in the direction of arrow 21.

Further, improvement to the aroma seal is achieved in the present invention, by embedding a magnet 6 in a soft plastic sealing ring 9. This kind of sealing ring has the additional advantage that the magnet is kept at a defined distance from its opposite pole, or in other words, a defined distance from the shaker cap 4, and as a result can provide a desired magnetic force therebetween. A metal ring may be placed around the top region of the spice container 3 to act as an opposite pole, instead of the shaker cap.

In the present invention, the spice container 3 is ready for use as soon as the closure body is simply removed from the spice container 3. When the closure body 2 is held by the holder 1, adequate aroma sealing is attained by the magnetic attraction between the shaker cap 4 of the spice container 3 and the magnet 6 in the closure body 2.

The closure body 2 preferably has a tubular receiving part 8 for the spice container's neck 5; a magnet and a magnetic element formed of a ferromagnetic material, are mounted on the receiving part 8 of the closure body 2 and on the container's neck 5, respectively, so that when the container's neck is introduced into the tubular receiving part, retention and sealing of the spice container 3 in the closure body is attained by means of the force of attraction acting between the magnet 6 and the magnetic element.

According to the present invention, (FIGS. 4 and 5) a holder 22 be provided with which the closure bodies 24 of the spice containers are integrated. The holder 22 is preferably formed as a plastic rail 23, on the underside of which, a magnet in the form of a strip 24 or a magnetic strip 24 is attached, and the spice containers 3 are provided with shaker cap mountings 4 formed of magnetic material, which are held on the strip by a magnetic force. To make it easier to grasp individual spice containers, the strip may be provided, at intervals, with spacers 25 between adjacent spice containers. The strip 24 may be provided with apertures 26 at said intervals, through which protrusions 25 from the rail extend, so that the protrusions 25 form the spacers. These protrusions may optionally serve, at the same time, to retain the strip in the holder.

In the version of the present invention described above, it may be considered a disadvantage that the spice container is not closed once it is removed from the holder. To overcome this objection, the closure body, may in a known manner, be sealed after removal from the holder.

According to FIGS. 1 and 2 of the present invention, this holder (rack) can be formed as a rail of approximately semicircular cross section, and the closure body has a mounting region 8, with a cleat 18 and a resilient mounting cam 19 for engaging the holder 1; the cleat engages the holder at a back portion of the holder. In this form, in the present invention, the spice container 3, with the closure body 2 in place and retained by magnetic force, can easily be removed from the holder (rack) by a swiveling motion and thus can be placed on the table while still closed. The container may then be opened at the table in a known manner by removing the closure body. A perforated shaker cap may be fixedly held in place on the spice container after the closure body is removed from the spice container.

Various changes and modifications may be made, and features described in connection with the embodiments may be used in any combination, within the scope of the inventive concept.

We claim:

1. A spice container and holder assembly comprising:
   at least one holder means for holding at least one spice container, said at least one spice container having an open top portion;
   a closure means (2, 24) for each of said at least one spice container, said at least one spice container being held by a magnetic force of a magnet means to said closure means (2, 24);
   each of said closure means including sealing means for sealing said open top portion of said at least one spice container, said sealing means including:
      said magnet means, positioned between said at least one spice container and that one of said closure means mounted on said at least one container; and
      magnetic means positioned adjacent to, but spaced apart from said magnet means, said magnetic means comprising one of a shaker cap (4) and a shaker cap mounting means that are respectively formed of a ferromagnetic material, said one of said shaker cap (4) and said shaker cap mounting means cooperating with said magnet means when said magnet means and said magnetic means are magnetically attracted to each other to eliminate the spaced apart positioning of the magnet means and the magnetic means to thereby form a seal therebetween for sealing said open top portion of said spice container;
   whereby said sealing means maintains said seal even when said at least one container is not held by said holder means.

2. The assembly according to claim 1, wherein said magnet means and said magnetic means are respectively secured to said closure means and to said open top portion of said at least one spice container.

3. The assembly according to claim 1, wherein:
   said at least one holder means comprises a rack for holding a plurality of spice containers therein; and
   said magnetic means comprises a perforated shaker cap mounted on said at least one spice container.

4. The assembly according to claim 1, wherein:
   said closure means comprises:
   a tubular receiving region for receiving said open top portion of said at least one spice container; and
   a mounting region for securing said at least one spice container adjacent to a mounting position of said magnet means;
   said magnet means being retained by a sealing member; and wherein:
   said magnetic means comprises said shaker cap for sealing said open top portion of said at least one spice container when said magnetic means is magnetically attracted by said magnet means.

5. The assembly according to claim 4, wherein at least one of said magnet means and said shaker cap has a plastic coating thereon.

6. The assembly according to claim 4, wherein:
   said at least one holder means is substantially semicircular in a cross-section thereof, said at least one holder means including a back portion; and
   said mounting region of said closure means is provided with a cleat and with a resilient mounting cam for engaging said at least one holder means; and
   said cleat engaging said holder means from said back portion of said holder means.

7. The assembly according to claim 4, wherein:
   said magnet means is retained by a soft plastic sealing ring; and
   said sealing ring is press-fitted into said tubular receiving region of said closure means.

8. The spice container and holder assembly of claim 1, wherein said magnet means is integrally formed with said closure means.

9. The spice container and holder assembly of claim 1, wherein said magnet means is integrally formed with said holder means.

10. The spice container and holder assembly of claim 1, wherein the spice container comprises:
a hollow container body having said open top portion for holding a spice therein; and wherein:
said closure means is removably mountable on said open top portion of said container body;
said sealing means is mounted on said hollow container body; and said closure means seals said hollow container body by use of said magnetic force of said magnet means.

11. The spice container and holder assembly according to claim 10, wherein:
said closure means includes a tubular receiving part for receiving a neck portion of said hollow container body; and
said sealing means including said magnet means and said magnetic means respectively mounted on one of said tubular receiving part of said closure means and said neck portion of said hollow container body.

12. The spice container and holder assembly according to claim 11, further comprising:
gap forming means for providing and maintaining a narrow air gap between said magnet means and said magnetic means.

13. The spice container and holder assembly according to claim 12, wherein said magnet means is positioned in said tubular receiving part of said closure means and said magnetic means comprises one of said shaker cap and said shaker cap (4) mounting means that is attached to said neck portion of said hollow container body.

14. The spice container and holder assembly according to claim 10, wherein said sealing means includes gap forming means for providing and maintaining a narrow air gap between said magnet means and said magnetic means.

15. The spice container and holder assembly according to claim 11, wherein;
said magnet means is positioned in said tubular receiving part of said closure means; and
said magnetic means comprises one of said shaker cap (4) and said shaker cap mounting means, attached to said neck portion of said hollow container body.

16. The spice container and holder assembly according to claim 15, wherein one of said magnet means and said one of said shaker cap (4) and said shaker cap mounting means is provided with a plastic coating.

17. The spice container and holder assembly according to claim 11, wherein said magnet means is retained by a soft plastic sealing ring that is pressed-fit into said tubular receiving part of said removable closure means.

18. The spice container and holder assembly according to claim 10, wherein said sealing means comprises said magnet means for providing said magnetic force.

19. A spice container and holder assembly according to claim 10, wherein:
said closure means is detachably secured to said at least one holder means, said at least one holder means being stationarily mountable; and wherein:
said at least one holder means comprises a rail having a substantially semi-circular cross-section;
said closure means comprises a cleat and a resilient mounting cam for engaging a mounting region of said at least one holder means; and
said mounting region of said at least one holder means being on a back portion of said at least one holder means.

20. A spice container and holder assembly according to claim 1, wherein said closure means is removably mountable on one of said container and said at least one holder means; and wherein:
said at least one holder means holds said removably mountable closure means; and
said removably mountable closure means is integrated with said holder means; and
said at least one spice container has a substantially cylindrical shape and is provided with recessed grip portions on first and second diametrically opposed portions thereof.

* * * * *